US012105062B2

(12) United States Patent
Bowers, II et al.

(10) Patent No.: US 12,105,062 B2
(45) Date of Patent: Oct. 1, 2024

(54) CARBIDE-DERIVED CARBON FOR SOLID-PHASE MICRO EXTRACTION MEDIA

(71) Applicant: BAE Systems Information and Electronic Systems Integration Inc., Nashua, NH (US)

(72) Inventors: Michael J. Bowers, II, Sykesville, MD (US); Don A. Harris, Columbia, MD (US); Tadd C. Kippeny, Pasadena, MD (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 648 days.

(21) Appl. No.: 17/268,551

(22) PCT Filed: Sep. 5, 2018

(86) PCT No.: PCT/US2018/049486
§ 371 (c)(1),
(2) Date: Feb. 15, 2021

(87) PCT Pub. No.: WO2020/050829
PCT Pub. Date: Mar. 12, 2020

(65) Prior Publication Data
US 2021/0318272 A1    Oct. 14, 2021

(51) Int. Cl.
*G01N 30/18* (2006.01)
*G01N 30/12* (2006.01)
(Continued)

(52) U.S. Cl.
CPC ............. *G01N 30/12* (2013.01); *G01N 30/18* (2013.01); *G01N 30/30* (2013.01); *G01N 2030/025* (2013.01); *G01N 2030/128* (2013.01)

(58) Field of Classification Search
CPC ...................................................... G01N 30/18
See application file for complete search history.

(56) References Cited

U.S. PATENT DOCUMENTS 3,779,066 A * 12/1973 Fore .......................... G01N 7/14
73/23.25
5,691,206 A    11/1997 Pawliszyn
(Continued)

FOREIGN PATENT DOCUMENTS

JP    H06165933    *    6/1994
WO    WO-03075772 A2 *    9/2003    ......... A61B 10/0045

OTHER PUBLICATIONS

International Search Report, PCT/US2018/049486, mailed Nov. 6, 2018, 9 pages.

*Primary Examiner* — Jamel E Williams
*Assistant Examiner* — Alex T Devito
(74) *Attorney, Agent, or Firm* — Scott J. Asmus; Gary McFaline; KPIP Law, PLLC

(57) ABSTRACT

A system and method for utilizing a carbide-derived carbon (CDC) fiber in solid-phase micro extraction. Optically pumping the carbide-derived carbon (CDC) fiber, as compared to using thermal desorption, enhances performance of the system. CDC provides for a broad based sorbent that is insensitive to high humidity. Optical pumping may be done axially or radially on a modified gas chromatography needle. In some cases, staged, or pulsed, optical pumping is used to drive off solvent or other lower boiling compounds first and then the desorption of the remaining analytes is cleaner and the instrumentation is less likely to be overloaded.

16 Claims, 11 Drawing Sheets

(51) Int. Cl.
   *G01N 30/30*   (2006.01)
   *G01N 30/02*   (2006.01)

(56) References Cited

U.S. PATENT DOCUMENTS

| | | | |
|---|---|---|---|
| 5,693,228 | A | 12/1997 | Koehler et al. |
| 6,164,144 | A | 12/2000 | Berg |
| 7,776,615 | B2 | 8/2010 | Yuka et al. |
| 8,365,575 | B2 | 2/2013 | Kippeny |
| 8,833,140 | B2 | 9/2014 | Bowers, II et al. |
| 9,103,804 | B2 | 8/2015 | Badorrek et al. |
| 9,278,335 | B2 | 3/2016 | Sengupta et al. |
| 9,558,926 | B2 | 1/2017 | Musselman |
| 2002/0050470 | A1* | 5/2002 | Jinno .............. G01N 30/6065 210/321.79 |
| 2007/0037366 | A1* | 2/2007 | Nakamura ........ H01L 21/02529 438/482 |
| 2011/0133069 | A1* | 6/2011 | Holmquist ......... G01N 33/6848 250/282 |
| 2012/0073360 | A1 | 3/2012 | Hunka et al. |
| 2014/0017158 | A1 | 1/2014 | Sengupta et al. |
| 2015/0364310 | A1* | 12/2015 | Musselman ........... H01J 49/045 250/282 |
| 2017/0054050 | A1 | 2/2017 | Mader et al. |
| 2017/0204636 | A1 | 11/2017 | Sack |
| 2019/0041305 | A1 | 2/2019 | Bowers, II et al. |
| 2019/0060865 | A1 | 2/2019 | Sengupta et al. |
| 2019/0060866 | A1 | 2/2019 | Bowers, II et al. |

\* cited by examiner

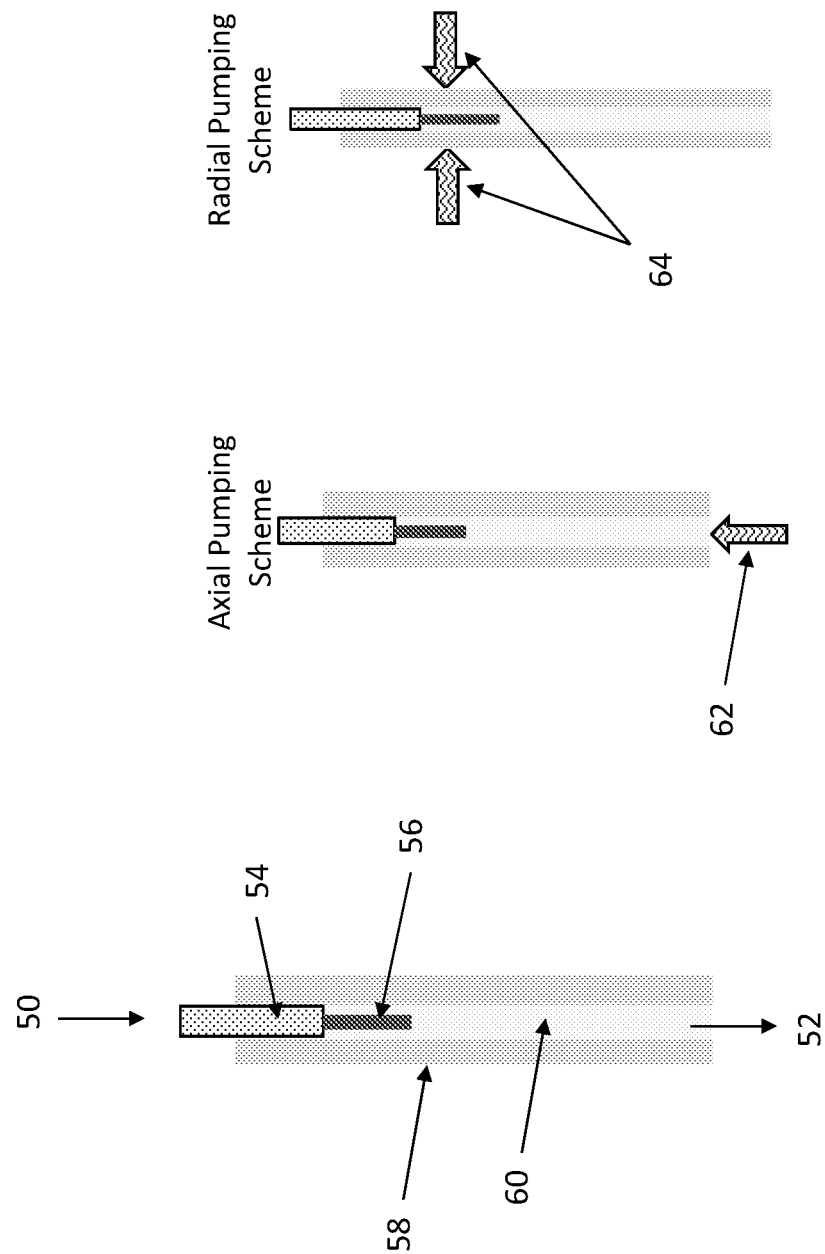

FIG. 6

Column 1 (Polar):
- hexamethyldisiloxane
- 2,3-butadione
- acrylonitrile
- 4-methyl-2-pentanone
- 2-butanone
- methyl acrylate
- 4-vinylcyclohexene
- trichloroethene
- 3-carene
- toluene
- 1,2-dichlorobenzene
- amyl acetate
- decane
- carbon disulfide
- tetrahydrofuran
- ethyl acetate
- methyl tertbutyl ether
- chloroform
- cis-1,3-dichloro propene
- propene
- 2-propanol
- 2-methylpropanenitrile Column 2 (Non-polar):
- styrene
- 1,7-octadiene
- ethyl ether
- 2-methyl-propanal
- cyclopentene
- vinyl acetate
- 2-methyl-2-pentene
- acetonitrile
- 1,2-dichloroethane
- 1-chloropentane
- ethyl isobutyrate
- n-propyl acetate
- 2,4-dinitrotoluene
- cyclohexanone
- α-pinene
- benzaldehyde
- methacrolein
- methylcyclohexane
- hexanal
- myrcene
- o-xylene
- methylcarbamate Column 3:
- dodecane
- dimethyl sulfide
- ethanethiol
- vinyl chloride
- 3-methylthiophene
- bromoform
- 1,1,1,2-tetrafluoroethane
- 3-chloro-1-propene
- octafluorocyclobutane
- 2,2-dimethylpropane
- dibromomethane
- trichlorofluoromethane
- chlorobenzene
- dichloromethane
- 1,3,5-trioxane
- triethylphosphate
- dimethyl methylphosphonate
- 2-chloroethylethylsulfide
- 2-chloroethylphenylsulfide
- methyl salicylate
- diethylmalonate
- nitrogen dioxide Legend: Polar | Non-polar | Volatile | Non-volatile

CARBIDE-DERIVED CARBON FOR SOLID-PHASE MICRO EXTRACTION MEDIA

STATEMENT OF GOVERNMENT INTEREST

This invention was made with United States Government support under Contract No. W911SR-17-C-0062 and/or W911SR-16-C-0070 awarded by the United States Army. The United States Government has certain rights in this invention.

FIELD OF THE DISCLOSURE

The present disclosure relates to chemical sampling, and more particularly to the use of carbide-derived carbon fibers as solid-phase micro-extraction media.

BACKGROUND OF THE DISCLOSURE

Solid-phase micro-extraction (SPME) is a solid phase extraction sampling technique that involves the use of a fiber coated with an extracting phase, that can be a liquid (polymer) or a solid (sorbent). The extracting phase extracts different kinds of analytes (including volatile and non-volatile) from different kinds of media that can be in liquid or gas phase.

One benefit of SPME is that the extraction is fast, simple, and can be done usually without solvents. Additionally, SPME detection limits can reach parts per trillion (ppt) levels for certain compounds. SPME also has great potential for field applications, because on-site sampling can be done easily without the need for gas chromatography-mass spectrometry equipment at each location. When samples are properly stored, they can be analyzed days later in the laboratory without significant loss of volatiles. After extraction, the SPME fiber is transferred to an injection port of a separating or detection instrument, such as a gas chromatograph or a mass spectrometer, where desorption of the analyte and chemical analysis is carried out.

Currently, users rely on SPME as a sampling method to identify unknown chemicals found in the field. Conventional SPME fibers are typically specific to a class of compounds. This means that either multiple samples must be analyzed using multiple different SPME fibers to cover a range of chemical classes. Further, it means that if the unknown is not covered by the standard battery or SPME fibers, a false negative test can occur resulting in a potentially hazardous substance being improperly handled or disposed.

Wherefore it is an object of the present disclosure to overcome the above-mentioned shortcomings and drawbacks associated with the conventional solid-phase micro-extraction.

SUMMARY

One aspect of the present disclosure is a system comprising of a carbide derived carbon (CDC) fiber as a SPME fiber collector for trace analytes. The CDC fiber is housed inside a retractable gas chromatograph (GC) needle and introduced to a chemical detection system through a GC needle inlet port whereby chemical desorption is performed either by thermal desorption—an inlet port at an elevated temperature (ca. 300° C.), or optical desorption—a light source used to heat the CDC fiber above the desorption temperature (ca. 300° C.).

One aspect of the present disclosure is a method of solid-phase micro-extraction, comprising: providing a gas chromatograph (GC) needle comprising a carbide-derived carbon (CDC) fiber core; subjecting a sample to be analyzed comprising one or more analytes to the needle comprising the carbide-derived carbon (CDC) fiber core; inserting the needle into the injection port of a detection system comprising a gas chromatograph; and desorbing the one or more analytes from the needle comprising the carbide-derived carbon (CDC) fiber core using a heated injection port.

One embodiment of the method of solid-phase micro-extraction is wherein the carbide-derived carbon (CDC) fiber is surface modified to aid in the detection of specific analytes. Another embodiment of the method of solid-phase micro-extraction is wherein the optical desorption step uses staged desorption to limit over-loading the detection system, enabling the sampling of liquids. In some cases, the needle further comprises an inner sheath and an outer sheath.

Another aspect of the present disclosure is a method of solid-phase micro-extraction, comprising: providing a gas chromatograph (GC) needle comprising a carbide-derived carbon (CDC) fiber core; subjecting a sample to be analyzed comprising one or more analytes to the needle comprising the carbide-derived carbon (CDC) fiber core; inserting the needle into an injection port of a detection system comprising a gas chromatograph; and desorbing the one or more analytes from the needle comprising the carbide-derived carbon (CDC) fiber core using optical heating.

One embodiment of the method of solid-phase micro-extraction is wherein the carbide-derived carbon (CDC) fiber is surface modified to aid in the detection of specific analytes. Another embodiment of the method of solid-phase micro-extraction is wherein the desorption step uses staged desorption to limit over-loading the detection system. In some cases, the needle further comprises an inner sheath and an outer sheath.

Yet another embodiment of the method of solid-phase micro-extraction is wherein the GC injection port further comprises a glass or metal insert liner with a reflective metal coating on its inner diameter.

Still yet another embodiment of the method of solid-phase micro-extraction is wherein the optical heating step is radially pumped. In some cases, the optical heating step is axially pumped. In certain embodiments, the optical heating step comprises a laser diode. In other embodiments, the optical heating step comprises a flash lamp.

Yet another aspect of the present disclosure is a solid-phase micro-extraction system, comprising: a gas chromatograph (GC) needle comprising a carbide-derived carbon (CDC) fiber core; and an injection port of a detection system comprising a glass insert liner, wherein the detection system comprises a gas chromatograph.

One embodiment of the solid-phase micro-extraction system is wherein the carbide-derived carbon (CDC) fiber is surface modified to aid in the detection of specific analytes. Another embodiment of the solid-phase micro-extraction system is wherein desorption of one or more analytes from the needle uses staged desorption to limit over-loading the detection system.

In some cases, the injection port further comprises a glass insert liner coated with a metal coating. In certain embodiments, desorption of one or more analytes utilizes optical heating that is radially pumped. In other embodiments, desorption of one or more analytes utilizes optical heating that is axially pumped.

In yet another embodiment of the solid-phase micro-extraction system, desorption of one or more analytes utilizes optical heating via a laser diode or a flash lamp.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 4A shows one embodiment of a solid-phase micro-extraction system utilizing carbide-derived carbon fibers for the extraction media.

FIG. 4B shows one embodiment of a solid-phase micro-extraction system utilizing carbide-derived carbon fibers for the extraction media as shown in FIG. 4A, when subjected to axial optical pumping.

FIG. 4C shows one embodiment of a solid-phase micro-extraction system utilizing carbide-derived carbon fibers for the extraction media as shown in FIG. 4A, when subjected to radial optical pumping.

FIG. 6 shows a non-exhaustive list of detected chemicals spanning polar, non-polar, volatile and non-volatile compounds, demonstrating CDC's adsorption and desorption across broad spectrum of compounds.

DETAILED DESCRIPTION

Figure 1A:
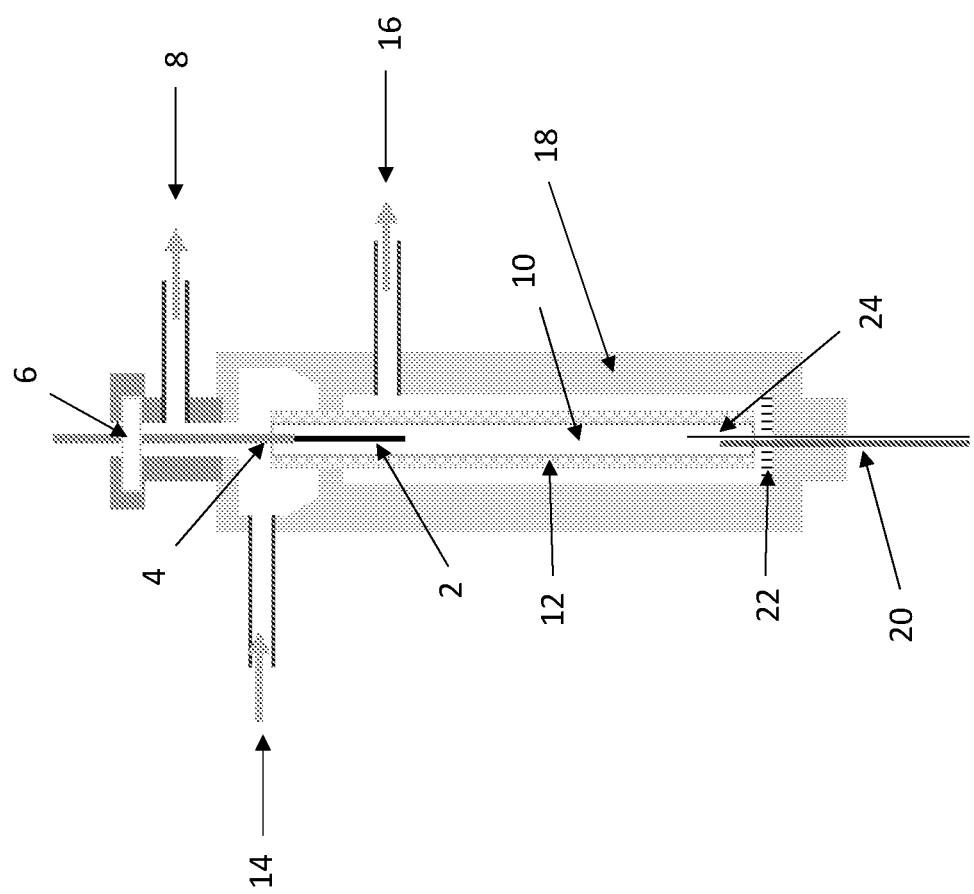
FIG. 1A shows one embodiment of a GC inlet for the solid-phase micro-extraction system utilizing carbide-derived carbon fibers for the extraction media.

Conventional SPME fibers are typically specific to a class of compounds. This means that either multiple samples must be analyzed using multiple different SPME fibers to cover a range of chemical classes or it means that if the unknown is not covered by the standard battery of SPME fibers a false negative test can occur resulting in a potentially hazardous substance being improperly handled or disposed. Having a single SPME solution, such as is disclosed herein, reduces exposure risks associated with taking multiple samples. One embodiment of the present disclosure utilizes the broad capture ability of carbide derived carbon (CDC) fibers to reduce the hazards associated with misidentifying or totally missing a hazardous substance because it was not collected by the standard battery of SPME fibers.

Compared to carbon nanotubes (CNT), zeolites, metal organic frameworks (MOF), mesoporous silica, activated carbon, composite materials, and organic polymer derived materials, CDC offers almost unlimited opportunities for porosity (size, shape, and surface chemistry) tuning, in combination with a high specific surface area (SSA) and a narrow pore size distribution. For example, CDC produced from $Ti_3SiC_2$ at moderate temperatures has a narrower pore-size distribution than single-wall carbon nanotubes or activated carbons and is comparable to that of zeolites. However, for a given zeolite structure, only a single discrete pore size is typically evident thus coupling of the pore size with SSA. Extreme fine tuning of CDC pore sizes, from 0.6 to 3 nm, is readily attainable at temperatures between 300 and 800° C. CDC pore size can be tuned continuously with a very high (sub-nanometer) precision, which is impossible in most other materials. Zeolites or MOFs, because the pore size is determined by the crystal structure do not have this capability. Narrow pore size distribution is much more important for CDC than order and has a much greater impact on adsorption/desorption rates and profiles. The ability to tune the pore size to perfectly fit the size and chemistry of the molecule of interest, and the availability of a large volume of pores with required size is of key importance, not the structure ordering or any other parameter. This independence leads to a high heat of adsorption, which provides not only catching and keeping gas molecules, but also releasing them quickly for analysis.

In addition, initial surface chemistry of CDC can be maintained or covalently modified without changing the pore size (except for the size of the functional group). Again, this cannot be done in many other porous materials, such as nanotubes where tube sidewalls are very difficult to modify. Furthermore, a change in MOF pore size necessitates a change in the internal chemical composition. Therefore, the pore size in MOFs is limited by what this chemistry can deliver. It is impossible to make a MOF with 5 nm pores, which is a feat easily obtainable with CDC.

Thus, changing pore size in CDC does not require the expense of making a variety of structures, each of which includes a compositional change. Moreover, pore size in CDC is not tied to the chemical interactivity of pore lining, allowing a disconnect between pore sizing and functionalization. A CDC material with any pore size can be subjected to functionalization after it is made. This allows materials with various pore sizes to be made which have the exact same chemical lining. This unique advantage of CDC to functionalize after determining pore size allows for specific chemical design of a functionalized CDC towards both a distinct chemical compound (such as a chemical nerve agent) or a broad class of chemical compounds (such as aromatics).

CDC is formed by leaching metal(s) from metal carbide in a high temperature, halogenated environment. Since the metal carbide lattice is used as a template and metal is extracted layer-by-layer, atomic level control can be achieved in the synthesis process and the structure of the carbon can be templated by the carbide structure, with an opportunity for further structure modification by controlling the temperature, composition of the environment and other process variables. The result is a nanoporous carbon skeleton having nanometer-tunable pore sizes (0.6-3 nm) with a narrow size distribution. Pore size is a function of both the specific carbide initially chosen for processing, as well as the temperature of the processing. The choice of starting carbide and post processing temperature are the preferred parameters to be varied in tuning the pore size.

CDC materials exhibit excellent adsorptive performance with respect to chemical agents that have no specific chemical interaction and must be captured purely by London forces. Therefore, CDC has been discovered to be an excellent adsorbent for the noble gases. Also, a potential can be applied across the CDC for trapping polarizable analytes, which allows selection between "hard" and "soft" electronic species, e.g., neon versus xenon. Thus, CDC provides multiple orthogonal chemical selection criteria: molecular shape/size, chemical class, and polarizability. These variables can be independently adjusted by modification of the CDC pore size, internal chemical modification, and electrical properties. This allows, for example, a small, hard, positively charged amine species such as dimethylformamide, to be uniquely adsorbed as a class while excluding a small, soft, neutral species such as xenon. This type of exclusion is not possible with traditional atmospheric sampling materials.

CDC's ability to perform gas separation enables reversible binding to molecules of interest and a correlation concept that greatly reduces analysis time by reducing or eliminating the GC step in the analysis process, enabling direct injection into a mass spectrometer.

In particular, the CDC pore surface can be uniquely modified to selectively adsorb desired gas molecules and minimize adsorption of undesirable, but ubiquitous, atmospheric species (water rejection). This is not the case for many of the competitive technologies. Furthermore, while highly ordered pores typically are required for rapid controlled desorption, CDC does not follow this trend. Also, CDC can be easily fabricated into a variety of shapes, films, fibers, nanotubes, powders, pellets, membranes and whisker, with or without mesopores, all with large surface areas of up to 2,200 $m^2/g$. This ability allows optimization of the adsorption and desorption rates and can minimize packaging requirements and cost.

Finally, water is a ubiquitous atmospheric contaminate which leads to many sampling problems. While unmodified CDC material adsorbs approximately 15% of its weight of water when exposed to humid air, it has been found that chemical modification of CDC can greatly reduce water adsorption. For example, water adsorption isotherms show that a CDC material with a simple ammonia post treatment has the ability to exclude water as indicated by the less than 1% mass change in a 90% relative humidity atmosphere. Thus, with proper functionalization, water adsorption by CDC is greatly diminished, and often the same adsorbent features that enable hyperadsorptivity for certain compounds also enhance unwanted water adsorption.

Referring to FIG. 1A, one embodiment of a solid-phase micro-extraction system utilizing carbide-derived carbon fibers for the extraction media is shown. More specifically, a needle such as a modified gas chromatograph (GC) needle is used as a needle within a needle construction. In certain embodiments, the sorbent (CDC) is synthesized directly on a substrate surface so there are no binders to cause bleeding. In some cases, the substrate can be used as a resistive heating element for desorption. In certain embodiments, the CDC coating is integral to the surface of the needle and as such is much more robust. The broad spectrum sorbent capability of the CDC fiber will reduce sampling time and potential for false negatives. The system disclosed herein is highly reusable (>400 cycles) and has low size, weight, and power requirements.

Still referring to FIG. 1A, a CDC fiber 2 is protected partially along its length by at least an inner sheath. In some cases, there is an outer sheath as well. The CDC needle 4 is used to collect samples of unknown chemicals or chemical mixtures for analysis. In one example, the needle 4 is inserted into a sample vial or enclosure, not shown, to allow chemicals present in the headspace in the vial to adsorb to the CDC needle. While the disclosure employs the term needle, it is not limited to needles and other implements include probes, picks, and similar instruments.

When the sample is ready to be analyzed, the CDC needle 4 is inserted through a septum 6 connected to a vaporization chamber. In some cases, there is a septum purge outlet 8. The needle, which is encased at least partially in an inner and outer sheath, is inserted into the vaporization chamber 10 comprising a glass insert liner 12. In some cases a carrier gas is used for the chemical analysis step (e.g., gas chromatography (GC)) and the carrier gas enters via an inlet 14 and exits via a split vent outlet 16, or the like. A portion of the carrier gas with the analyte from the CDC needle enters the GC column 20 for analysis.

In this embodiment the vaporization chamber 10 and glass insert liner 12 are encased in a block 18 which can be optionally heated. Here, a GC column 20 is used to separate the desorbed chemicals and is connected at an opposite end of the vaporization chamber from where the SPME needle is inserted. The GC column 20 is connected to the vaporization chamber 10 via a seal 22. In some cases, the seal is gold. In some cases, a standard gold seal with a metal shim is replaced with washerless dual vespel ring inlet gold seals, or the like.

Additionally, in certain embodiments an optical fiber 24 may be inserted through the seal 22. In certain embodiments, the optical fiber 24 is aligned with both the needle's 4 and the glass inlet liner's 12 longitudinal axes so as to be axially pumped. In one embodiment, the CDC is optically desorbed in a staged manner which helps to reduce issues with overloading the detection of the analytical instrument.

Figure 1B:
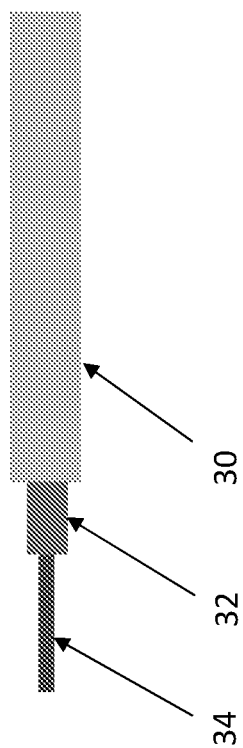
FIG. 1B shows a diagrammatic view of a modified GC needle according to the principles of the present disclosure.

Referring to FIG. 1B, a diagrammatic view of a modified GC needle 35 according to one embodiment of the present disclosure is shown. More specifically, an outer sheath 30 encompasses at least partially, an inner sheath 32, which encompasses at least partially a CDC SMPE fiber 34. In one example the inner sheath 32 holds the sampling fiber 34 and in one example uses a needle sized stainless steel tube which holds the sampling fiber, and the outer sheath is used to pierce the septum and comprises a larger needle sized stainless steel tube. In this application, CDC is used in a fiber form factor and acts as a broad-based, hyper-adsorptive material. The CDC is processed according to Applicant's previous work hereby incorporated by reference and including U.S. Pat. Nos. 8,365,575; 9,103,804; U.S. Application Ser. No. 15,667,667 filed Aug. 3, 2017; U.S. Pat. No. 15,690,507 filed Aug. 30, 2017; and U.S. application Ser. No. 15/690,358 filed Aug. 30, 2017. In another embodiment, the CDC can be used as a coating on a substrate that would be integral with the needle or coupled to the needle. In another example the CDC can be formed as a nanotube or similar structure in conjunction with the instrument.

Figure 2A:
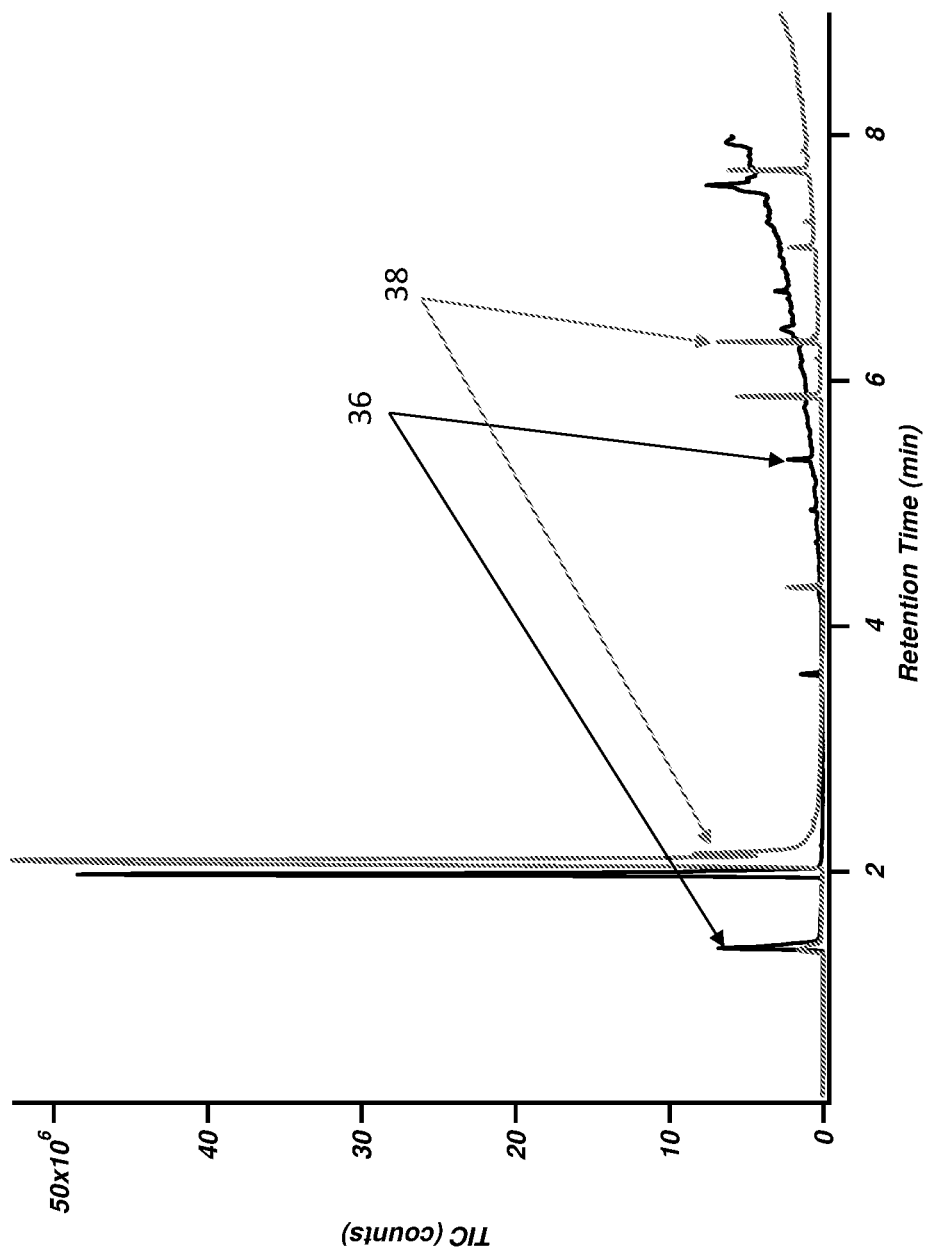
FIG. 2A shows a desorption chromatogram of one embodiment of a solid-phase micro extraction system utilizing carbide-derived carbon fibers for the extraction media when being subjected to optical or thermal desorption sources.
Figure 7:
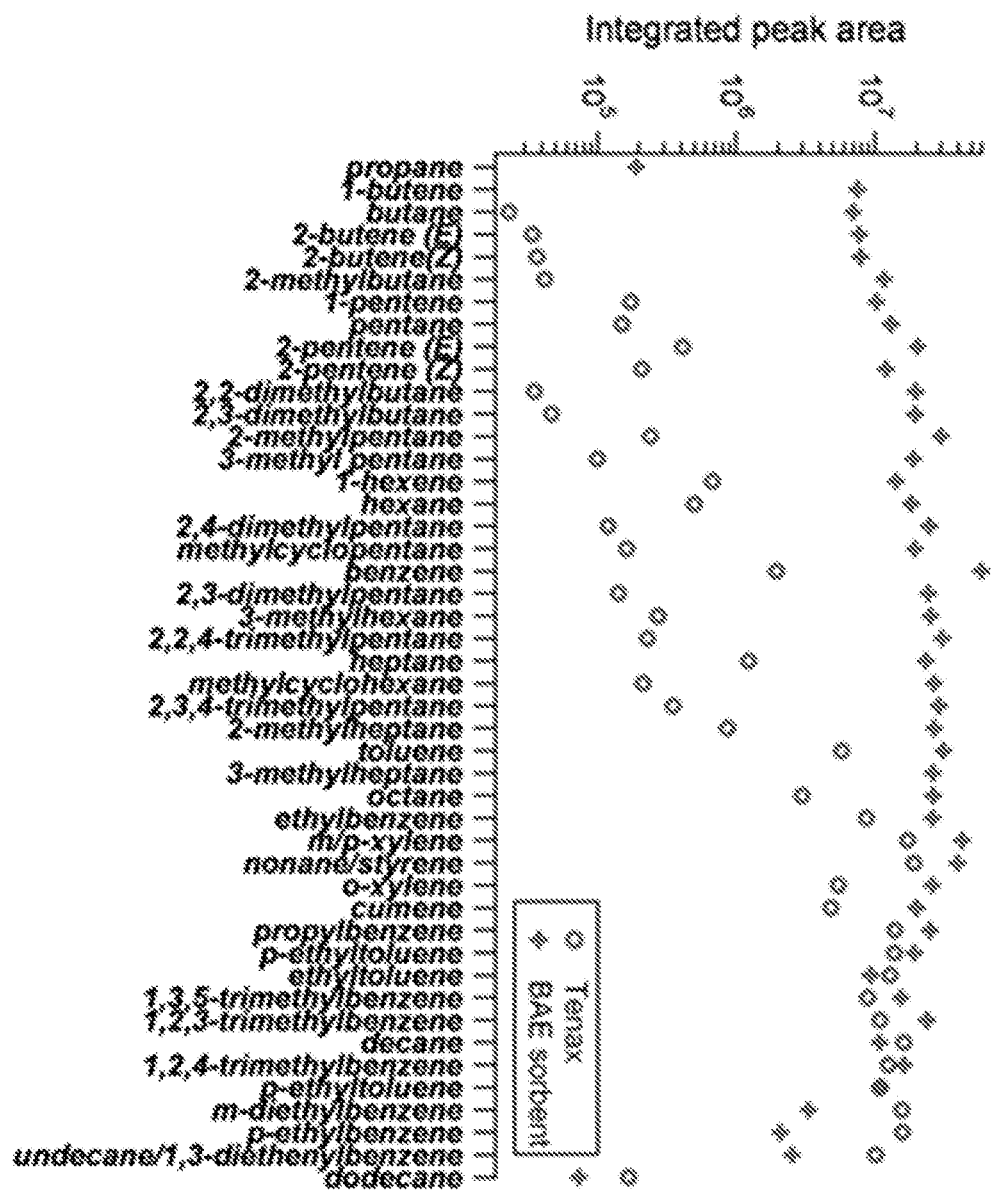
FIG. 7 shows analyte adsorption of CDC across molecular weights in comparison to Tenax Porous Polymer adsorbents, demonstrating CDC's absorption and desorption across compounds of different molecular weights.

Referring to FIG. 2A, a desorption chromatogram of one embodiment of a solid-phase micro-extraction system utilizing carbide-derived carbon fibers for the extraction media after being subjected to optical or thermal sources is shown. More specifically, CDC is a broad spectrum adsorbent capable of capturing a wide variety of compounds including, but not limited to, polar, non-polar, volatile, and non-volatile compounds, as shown in FIG. 6. CDC has been shown to capture difficult analytes such as low molecular weight hydrocarbons (e.g., ethane) and refrigerants. FIG. 7 shows CDC analyte adsorption across molecular weights in comparison to Tenax Porous Polymer Adsorbent. CDC is also a hydrophobic sorbent that performs very well in high relative humidity (RH) environments, and even in water.

Still referring to FIG. 2A, CDC headspace sampling with thermal desorption 36 is plotted over time. There, the injection port was held at a constant temperature of 280° C. CDC headspace sampling with optical desorption 38 is also plotted over time and shows better resolution. There, the injection port was help at 80° C. and a laser was on for 120 seconds. In this embodiment, the optical fiber coupled near infrared laser diode delivered around 6.5 W at the sample (9A, 2V across laser diode).

Figure 2B:
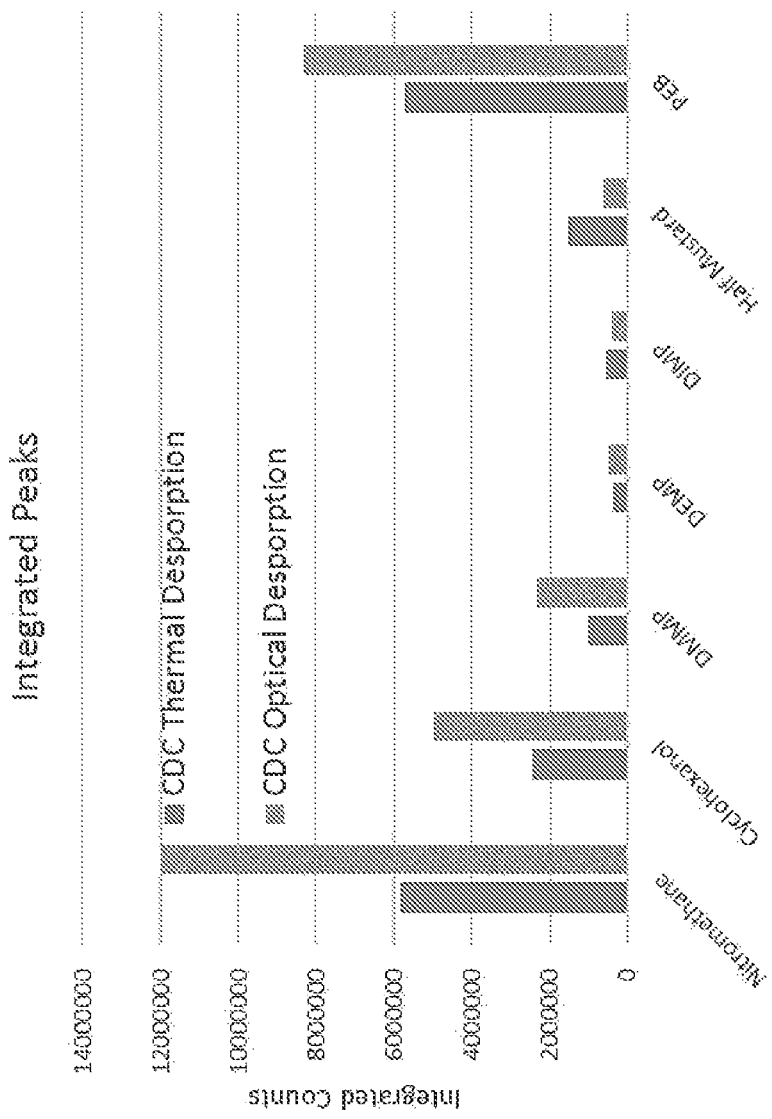
FIG. 2B shows the integrated peaks from a desorption chromatogram of one embodiment of a solid-phase micro extraction system utilizing carbide-derived carbon fibers for the extraction media when being subjected to optical or thermal sources.

Referring to FIG. 2B, the integrated peaks of the desorption chromatogram of one embodiment of a solid-phase micro-extraction system utilizing carbide-derived carbon fibers as the extraction media after being subjected to optical or thermal sources is shown. More specifically, CDC headspace sampling with thermal desorption for various compounds is compared to CDC headspace sampling with optical desorption. As is clear from the figure, optical desorption of the CDC SPME fiber outperformed thermal desorption for most compounds.

Figure 3A:
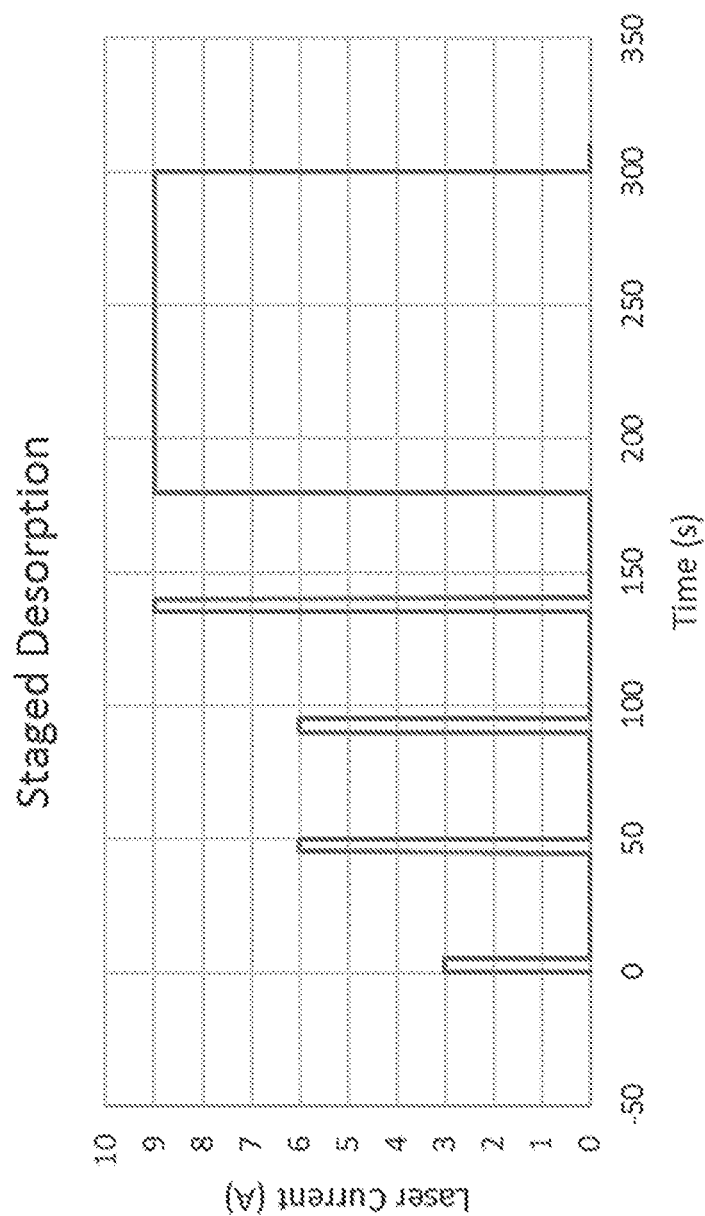
FIG. 3A shows an example of staged optical desorption according to the principles of the present disclosure.

Referring to FIG. 3A, an example of staged desorption according to the principles of the present disclosure is shown. More particularly, instead of turning on an optical source (e.g., a laser) and leaving it on to drive off all of the molecules associated with the CDC fiber at once, a staged desorption provides for the removal of lower boiling compounds (i.e., solvent) before desorbing the analytes in the sample. Here, four short pulses, 5 seconds in duration, at varying currents 45 seconds apart were used to drive off solvent prior to a prolonged pulse for 120 seconds to desorb the analytes in the sample.

Figure 3B:
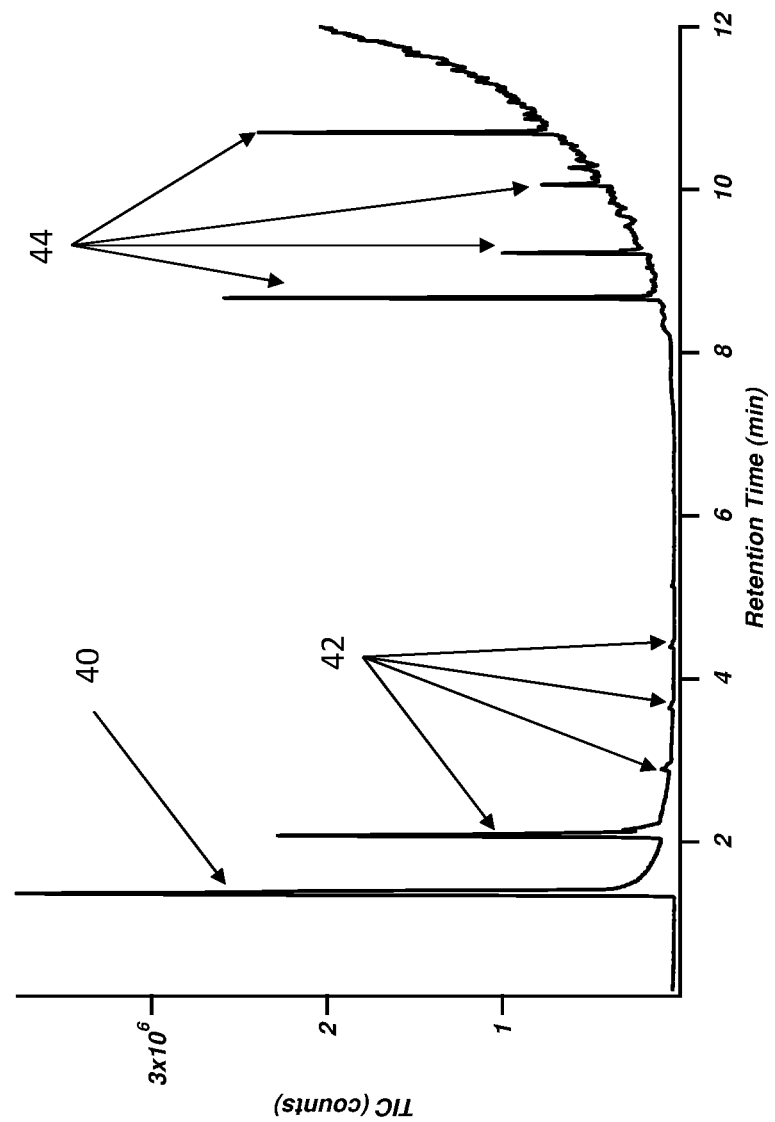
FIG. 3B shows a desorption chromatogram of one embodiment of a solid-phase micro extraction system utilizing carbide-derived carbon fibers for the extraction media when being exposed to staged desorption as shown in FIG. 3A.

Referring to FIG. 3B, a desorption chromatogram of one embodiment of a solid-phase micro-extraction system utilizing carbide-derived carbon fibers as the extraction media after being exposed to staged optical desorption similar to that shown in FIG. 3A, is shown. More specifically, the inlet temperature was reduced to 60° C. and air 40 was driven off with the first pulse. The following successive pulses drove off solvent (e.g., ethanol) 42. The later, sustained pulses drove off a series of analytes 44. In this embodiment, solvent can be reduced so as not to overload the detector. Without this staged desorption scheme, the solvent (ethanol) chromatogram peak would be an order of magnitude larger than the analyte peaks and risk drowning out the analyte peaks, as shown in FIG. 2A.

Referring to FIG. 4A, one embodiment of a solid-phase micro-extraction system utilizing carbide-derived carbon fibers for the extraction media is shown. More specifically, the diagram shows the region of the system from the GC septum 50 toward the GC column 52. The inner sheath 54 is shown surrounding a portion of the CDC SPME fiber 56 that has been inserted into the glass inlet liner 58, which is connected to the septum (not shown). The interior of the glass inlet liner forms the vaporization chamber 60.

Referring to FIG. 4B, one embodiment of a solid-phase micro-extraction system utilizing carbide-derived carbon fibers for the extraction media as shown in FIG. 4A, being subjected to axial pumping is shown. More specifically, in this embodiment the glass inlet liner is treated as an optical waveguide and pump light is coupled with it from a fiber coupled light source (e.g., laser, diode, flashlamp). In certain embodiments, the glass inlet liner is coated with a metal. In some cases, the glass inlet liner is coated via an electroless silver coating. In some cases the liner is coated with gold. Here, the coated liner acts as a waveguide to contain the light and heat the CDC fiber. Since the CDC fiber is visibly black, it has a strong absorbance's in the visible and near infrared, and behaves as a blackbody. Any optical source with strong emission in the visible and/or near infrared can therefore be used as the optical heating source.

Referring to FIG. 4C, one embodiment of a solid-phase micro-extraction system utilizing carbide-derived carbon fibers for the extraction media as shown in FIG. 4A, being subjected to radial pumping is shown. More particularly, an inlet heater was replaced with a helical Xenon flash lamp and pumped radially through the glass inlet liner. Because the CDC sorbent fiber is a strong black body light absorber, direct adsorption of light energy from illumination of the fiber causes a very rapid and intense heating of the fiber to a depth of several microns, thus eliminating the reliance on indirect thermal transfer. This intense surface heating causes a quick and efficient thermal desorption, without overheating and therefore with reduced thermal degradation and reduced rearrangement of the analyte molecules before their release from the carbonaceous surface.

While the sorbent fiber is heated by the light irradiation, the desorbed analytes are transported away from the sorbent and into the gas chromatograph. In some embodiments, a partial vacuum is created within the desorption chamber, and the analytes diffuse away from the sorbent and into the gas chromatograph. In other embodiments, the desorbed analytes are carried away by a carrier gas. After the desorption process is completed the sorbent sample is flushed from the chamber by a transport gas so that a new sample can be introduced.

So as to enable standard gas chromatographs and cryogen sampling traps to function with the system of the present disclosure, embodiments include carrier gas flow adaptors that enable the present invention to operate at a desired carrier gas flow rate. In some embodiments, the carrier gas flow rate is higher than what could normally be tolerated by an unmodified gas chromatograph.

Figure 5:
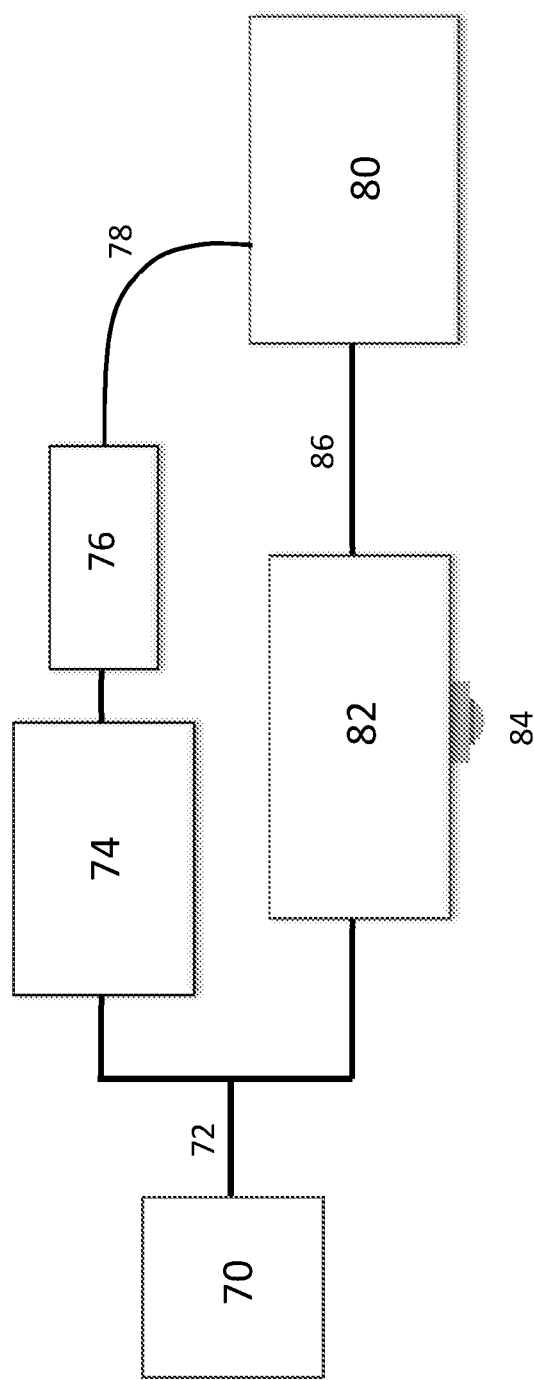
FIG. 5 shows a diagrammatic view of one embodiment of a solid-phase micro-extraction system utilizing carbide-derived carbon fibers of the present disclosure.

Referring to FIG. 5, a diagrammatic view of one embodiment of a solid-phase micro-extraction system utilizing carbide-derived carbon fibers of the present disclosure is shown. More specifically, a processing unit 70 is connected 72 to a light source 76 via a light source controller 74, which is optically connected 78 to an analytical instrument 80. In certain embodiments, the analytical instrument 80 is a detection system. In certain embodiments, the processor 70 is connected 72 via USB, or the like. In some cases, the optical source 76 is a laser or laser diode and it is optically connected 78 via an optical fiber to an instrument such as a GC-Mass Spectrophotometer (MS) 80. In one embodiment, a fiber coupled 10 W Laser Diode at 975 nm was used. In some cases, the system had a 30-50 ns rise time and the shortest recommended pulse was 100 ns. In certain embodiments, there is a controller box 82 with a start button 84 that is connected 86 to the analytical instrument. In some cases, the connection 86 is a DB9 serial connection. The processor 70 in one example the data from the analytical instrument is stored on the instrument, displayed and/or transmitted for further processing or review by a user.

Figure 8:
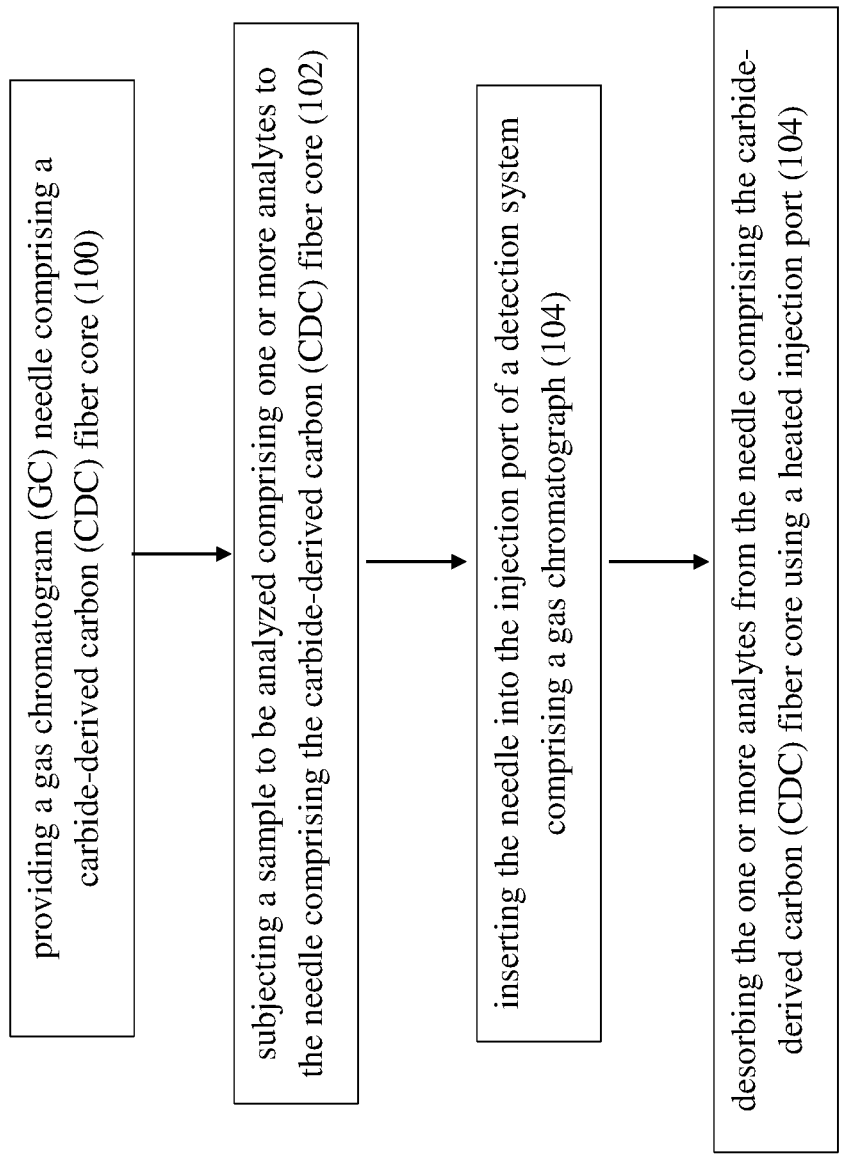
FIG. 8 shows one embodiment of a method according to the principles of the present disclosure.

Referring to FIG. 8, one embodiment of a method according to the principles of the present disclosure is shown. More specifically, the method of solid-phase micro-extraction provides a gas chromatograph (GC) needle comprising a carbide-derived carbon (CDC) fiber core (100) and subjects a sample to be analyzed comprising one or more analytes to the needle comprising the carbide-derived carbon (CDC) fiber core (102). When ready to analyze the sample, the needle is inserted into the injection port of a detection system comprising a gas chromatograph (104) and the one or more analytes are desorbed from the needle comprising the carbide-derived carbon (CDC) fiber core using a heated injection port (104). The results of the desorbing in one example are displayed to a user and stored. In another example the results are transmitted to a processor for further processing and review.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of solid-phase micro-extraction, comprising:
   providing a gas chromatograph (GC) needle comprising a carbide-derived carbon (CDC) fiber;
   subjecting a sample to be analyzed comprising one or more analytes to the needle comprising the carbide-derived carbon (CDC) fiber;
   inserting the needle into the injection port of a detection system comprising a gas chromatograph, wherein the injection port comprises a glass insert liner with a metal coating on the glass insert's inner diameter; and
   desorbing the one or more analytes from the needle comprising the carbide-derived carbon (CDC) fiber core using a heated injection port,
   wherein the needle further comprises an inner sheath and an outer sheath.

2. The method of solid-phase micro-extraction according to claim 1, wherein the carbide-derived carbon (CDC) fiber is surface modified to aid in the detection of specific analytes.

3. The method of solid-phase micro-extraction according to claim 1, wherein the desorption step uses staged optical desorption to limit over-loading the detection system.

4. A method of solid-phase micro-extraction, comprising:
   providing a gas chromatograph (GC) needle comprising a carbide-derived carbon (CDC) fiber;
   subjecting a sample to be analyzed comprising one or more analytes to the needle comprising the carbide-derived carbon (CDC) fiber;
   inserting the needle into an injection port of a detection system comprising a gas chromatograph, wherein the injection port comprises a glass insert liner with a metal coating on the glass insert's inner diameter; and
   desorbing the one or more analytes from the needle comprising the carbide-derived carbon (CDC) fiber using optical heating,
   wherein the desorbing uses staged desorption to limit over-loading the detection system.

5. The method of solid-phase micro-extraction according to claim 4, wherein the carbide-derived carbon (CDC) fiber is surface modified to aid in the detection of specific analytes.

6. The method of solid-phase micro-extraction according to claim 4, wherein the needle further comprises an inner sheath and an outer sheath.

7. The method of solid-phase micro-extraction according to claim 4, wherein the optical heating step is radially or axially pumped.

8. The method of solid-phase micro-extraction according to claim 4, further comprising displaying, storing or transmitting results from the desorbing of the one or more analytes.

9. The method of solid-phase micro-extraction according to claim 4, wherein the optical heating step comprises a laser diode.

10. The method of solid-phase micro-extraction according to claim 4, wherein the optical heating step comprises a flash lamp.

11. A solid-phase micro-extraction system, comprising:
    a gas chromatograph (GC) needle comprising a carbide-derived carbon (CDC) fiber;
    an injection port of a detection system comprising a glass insert liner, wherein the detection system comprises a gas chromatograph, and wherein the CDC fiber is insertable into the injection port, wherein the injection port further comprises a glass insert liner having a metal coating on the glass insert's inner diameter.

12. The solid-phase micro-extraction system according to claim 11, wherein the carbide-derived carbon (CDC) fiber is surface modified to aid in the detection of specific analytes.

13. The solid-phase micro-extraction system according to claim 11, wherein desorption of one or more analytes from the needle uses staged optical desorption to limit overloading the detection system.

14. The solid-phase micro-extraction system according to claim 11, wherein desorption of one or more analytes utilizes optical heating that is radially pumped.

15. The solid-phase micro-extraction system according to claim 11, wherein desorption of one or more analytes utilizes optical heating that is axially pumped.

16. The solid-phase micro-extraction system according to claim 11, wherein desorption of one or more analytes utilizes optical heating via a laser diode or a flash lamp.

* * * * *